United States Patent
Audigie et al.

(10) Patent No.: US 9,468,141 B2
(45) Date of Patent: Oct. 18, 2016

(54) DEVICE FOR A SELF-REGULATED PNEUMATIC SUPPLY WITH A MEANS FOR REGULATING THE AIR PASSAGE SECTION

(71) Applicant: KUHN S.A., Saverne (FR)

(72) Inventors: Jean-Charles Audigie, Bouxwiller (FR); Julien Eberhart, Veckersviller (FR); Nicolas Supper, Dangolsheim (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/441,392

(22) PCT Filed: Nov. 25, 2013

(86) PCT No.: PCT/FR2013/052841
§ 371 (c)(1),
(2) Date: May 7, 2015

(87) PCT Pub. No.: WO2014/080147
PCT Pub. Date: May 30, 2014

(65) Prior Publication Data
US 2015/0296703 A1    Oct. 22, 2015

(30) Foreign Application Priority Data
Nov. 26, 2012   (FR) ...................... 12 61236

(51) Int. Cl.
*A01C 7/08*        (2006.01)
*A01C 7/20*        (2006.01)

(52) U.S. Cl.
CPC ............... *A01C 7/082* (2013.01); *A01C 7/081* (2013.01); *A01C 7/20* (2013.01)

(58) Field of Classification Search
CPC .......... A01C 7/081; A01C 7/08; A01C 7/00; A01C 7/20; A01C 7/082
See application file for complete search history.

(56) References Cited

U.S. PATENT DOCUMENTS 4,060,181 A    11/1977   Grataloup

FOREIGN PATENT DOCUMENTS

| AT | 538 715 B2 | 8/1984 |
| FR | 2 730 713 A1 | 8/1996 |

OTHER PUBLICATIONS

International Search Report Issued Mar. 21, 2014 in PCT/FR13/052841 Filed Nov. 25, 2013.

*Primary Examiner* — Christopher J Novosad
(74) *Attorney, Agent, or Firm* — Oblon, McClelland, Maier & Neustadt, L.L.P.

(57) ABSTRACT

A device for a self-regulated pneumatic supply from a main reservoir containing product toward at least one auxiliary reservoir according to its filling rate, the supply device including a compressed air supply, a tilted duct connected to pipe connections, a bypass air duct having a first channel emerging near the outlet of the main reservoir and a second channel emerging near the inlet of the pipe connections to bring product to the auxiliary reservoir. At least one of the channels includes a sliding system for adjusting a passage section of air passing through one of the channels. The device can be applied to a seeder including such a supply device.

12 Claims, 2 Drawing Sheets

DEVICE FOR A SELF-REGULATED PNEUMATIC SUPPLY WITH A MEANS FOR REGULATING THE AIR PASSAGE SECTION

BACKGROUND

The present invention relates to the general technical field of agricultural machinery. The invention relates to a device for a self-regulated pneumatic supply from a main reservoir containing product toward at least one auxiliary reservoir according to its filling rate, the supply device comprising a compressed air supply, a tilted duct connected to pipe connections, a bypass air duct having a first channel emerging near the outlet of the main reservoir and a second channel emerging near the inlet of the pipe connections to bring product to the auxiliary reservoir.

Such a self-regulated pneumatic supply device is known from document FR 2 340 031. This device in particular comprises a bypass air duct having a first channel, the convergent of which emerges near the outlet of the main reservoir to carry seeds over an upward journey, and a second channel, the convergent of which emerges near the inlet of the conveying pipe connections to bring the seeds to the auxiliary reservoir. The air flow emitted by the first channel is used to remove the seeds from the main reservoir and drive them over an upward journey. The seeds are then picked up by the air flow emitted by the second channel to be conveyed to the auxiliary reservoirs.

In practice, such a supply device equips a seeder used to plant all types of seeds. This supply device must therefore supply the auxiliary reservoirs, whether the seeds are light or heavy, and easy or difficult to convey. In general, the air flow passing through the second channel is greater than the air flow passing through the first channel. This difference in air flow is obtained by the section difference of the channel necks. In order to adapt to the type of seeds to be distributed, the user changes the pressure and therefore the air flow produced by the compressed air source. Such a modification will affect the extracting flow of the seeds and the conveying flow. The air flow provided by the compressed air source results from a compromise between the extracting flow and the conveying flow. The conveying flow must be sufficient to take the seeds to the auxiliary reservoirs without the extracting flow driving too many seeds toward the pipe connections. With an excessive extracting flow, the supply of seeds to the auxiliary reservoirs is irregular, and it takes place in blocks. Such a supply of seeds in blocks requires frequent starting of the supply device.

BRIEF SUMMARY

The present invention aims to overcome the aforementioned drawbacks. It must in particular propose a device for a remote pneumatic supply with a regular and versatile operation.

To that end, one important feature lies in the fact that at least one of the channels comprises a means configured to adjust the passage section for air passing through one of the channels. Owing to this feature, one of the air flows can be adapted depending on the product to be distributed to at least one auxiliary reservoir. Such an adjustment is particularly interesting because it makes it possible to adapt to the capacity of the product to be taken on or the capacity of the product to be extracted without affecting the pressure and air flow of the compressed air source. The pickup continuity and therefore conveyance of the product to the auxiliary reservoirs are provided regularly.

Owing to another important feature, a means configured to adjust the air passage section is arranged in each channel. The independent adjustment of the extraction flow and the product conveying flow allows optimal adaptation depending on the product to be distributed. The supply of the auxiliary reservoirs is carried out regularly.

BRIEF DESCRIPTION OF THE DRAWINGS

Other features and advantages of the invention will emerge from the following description in light of the appended drawings, which are provided solely as non-limiting examples of the invention. In these drawings.

DETAILED DESCRIPTION

Figure 1:
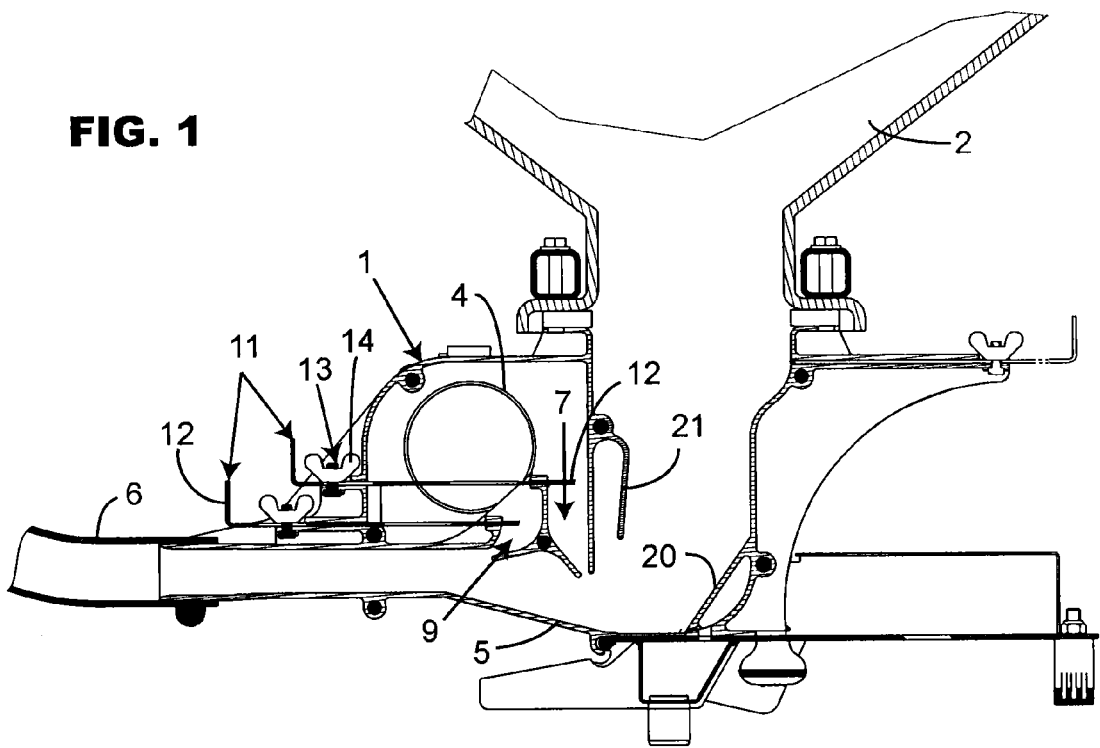
FIG. 1 shows a simplified sectional view of a supply device according to the invention.

FIG. 1 provides a simplified illustration of a device (1) for a remote self-regulated pneumatic supply, from a main reservoir (2), of product to at least one auxiliary reservoir (3) depending on its filling rate. This is a self-regulated pneumatic supply. The supply device (1) is mounted adjacent to the lower part of the main reservoir (2). The supply device (1) is connected to the outlet of the main reservoir (2). The supply device (1) comprises a compressed air source (4), a tilted duct (5) connected to pipe connections (6), a bypass air duct having a first channel (7) that emerges near the outlet of the main reservoir (2) and a second channel (9) that emerges near the inlet of the pipe connections (6) to bring the product to the auxiliary reservoir (3). The product to be distributed is for example a grain product such as seeds, fertilizer or powder. In the rest of the description, a product is considered such as seeds, which are not shown in the figures. The tilted duct (5) connects the lower portion of the main reservoir (2) to the pipe connections (6) that communicate with the auxiliary reservoirs (3). The tilted duct (5) comprises a rising part.

According to FIG. 1, the first channel (7) emerges in the tilted duct (5) near the outlet of the main reservoir (2). This first channel (7) is oriented downward to direct an air flow substantially transversely to the outlet of the main reservoir (2). The air flow emitted by the first channel (7) is used to pick up seeds descending by gravity toward the outlet of the main reservoir (2) and send it into the tilted duct (5). The product is then picked up by the air flow emitted by the second channel (9), which conveys it to the auxiliary reservoirs (3) via the pipe connections (6). The second channel (9) emerges slightly downstream from the conveying pipe connections (6), at the other end of the tilted duct (5). The second channel (9) is oriented obliquely relative to the tilted duct (5) so as to direct the air flow substantially in the axis of the pipe connections (6). Because they are situated on a same side of the main reservoir (2) and have substantially orthogonal orientations, the inlets of the convergents of the two channels (7 and 9) are one beside the other. A single and same compressed air source (4) supplies the two channels (7, 9). The air flow produced by the first channel (7) makes it possible to pick up seeds or the product at the bottom of the main reservoir (2), and the air flow produced by the second channel (9) makes it possible to carry the seeds or the product toward the auxiliary reservoirs (3).

The self-regulated pneumatic supply device (1) makes it possible to supply several auxiliary reservoirs (3) with product from a large-capacity main reservoir (2). When the supply is conditioned by the filling rate of the auxiliary reservoir (3), the supply of the auxiliary reservoir (3) is stopped to prevent the latter from overflowing. Since the product is regulated at the outlet of the auxiliary reservoir (3), the main reservoir (2) has no product regulating system.

During operation, the pile of seeds accumulated in the main reservoir (2) falls and flows through the outlet owing to the air flow created by the first channel (7). This air flow removes the seeds and conveys them toward the pipe connections (6) through the tilted duct (5), then they are driven by the air current emitted by the second channel (9) and sent to the auxiliary reservoirs (3) through the pipe connections (6). The difference in resistance to the flow of air blown by the channels (7 and 9) toward the pipe connections (6) varies with regard to the filling rate of the auxiliary reservoir(s) (3). Owing to the arrangement of the tilted duct (5) and its side connection to the lower part of the main reservoir (2), the risk of jamming, due to seeds building up at the bottom of the main reservoir (2), is reduced. The arrangement and orientation of the convergent of the first channel (7) makes it possible to create a high turbulence zone at the outlet of the main reservoir (2). The air current created by the first channel (7) causes the seeds to fall continuously, detach and be transferred through the tilted duct (5).

According to one important feature of the invention, at least one of the channels (7, 9) comprises a preset mean (11) to adjust the passage section for air passing through one of the channels (7, 9). Owing to this feature, one of the air flows may be adapted optimally to the product to be distributed without adjusting the air flow pressure of the compressed air source (4). The adaptation is carried out with regard to the ability of the seeds to be taken on and/or their ability to be extracted. One of the air flows is therefore adjusted independently of the other air flow and the air flow emitted by the compressed air source (4) to lead to a regular supply of seeds to the auxiliary reservoirs (3). The adjustment therefore takes place either for the air flow emitted by the first channel (7), which takes and directs the seeds toward the tilted duct (5), or for the air flow emitted by the second channel (9), which conveys the seeds toward the auxiliary reservoirs (3). The produced air flow may therefore be adjusted optimally, i.e., a minimal air flow but sufficient to ensure the picking up or conveyance of the seeds.

In a favored manner shown in FIG. 1, the mean (11), configured to adjust the passage section for air passing through a channel (7, 9), extends at the inlet of the channel (7, 9). In the illustrated example embodiment, the arrangement of the mean (11) at the inlet of the channel (7, 9) is easier to carry out. In an alternative that is not shown, the mean (11) extends at the outlet of the channel (7, 9). The mean (11) makes it possible to adjust the air passage section at the outlet of one of the channels (7, 9).

According to one preferred feature, each channel (7 and 9) comprises a mean (11) configured to adjust the passage section for the air passing through it. In this way, the air flow emitted by the first channel (7) and the air flow emitted by the second channel (9) can be adapted optimally according to the size and shape of the seeds while maintaining constant pressure provided by the compressed air source (4). The supply device (1) of FIG. 1 therefore has two independent means (11) for adjusting air passage section of the channels (7, 9). One mean (11) is arranged substantially at the inlet of the first channel (7), and one mean (11) is arranged substantially at the inlet of the second channel (9). The adjustment of the air flow for picking up seeds is independent of the adjustment of the air flow for taking on or conveying seeds. The supply device (1) according to the invention therefore allows a regular supply of the auxiliary reservoirs (3) while limiting the number of startups.

In the example embodiment of FIG. 1, the mean (11) preset for adjusting the passage section for air passing through a channel (7, 9) is a sliding system. The sliding system has a movable portion (12) intended to move in translation in a slideway or a stationary portion. The slideway makes it possible to guide the movement of the movable portion (12). Depending on the adjustment, the movable portion (12) is made to more or less obstruct the compressed air inlet through the channel (7, 9), and therefore to modify the air flow emitted by the channel (7, 9). When the air passage section is adjusted via the sliding system, the position of the movable portion (12) is locked using a locking system (13). The illustrated locking system (13) is a screw and nut system. In order to make manipulation and adjustment easier, the locking system (13) is provided with a wing-nut (14). The adjustment illustrated in FIG. 1 corresponds to an air flow for small seeds. Each movable portion (12), each mean (11), respectively, partially plugs the inlet of the channels (7, 9). During a remote distribution of large seeds, it is provided that the means (11) block the air passage through the channels (7, 9) little or not at all. The movable portions (12) are completely removed, leaving the air passage section at the inlet obstacle-free. The movable portion (12), the mean (11) preset for adjusting the air passage section, respectively, is also used to neutralize a row of seeds. In that case, the movable portion (12), the mean (11), respectively, is placed in a position that completely closes the air passage through the channel (7, 9).

The supply device (1) additionally has a tilted bottom (20). This tilted bottom (20) extends in the lower portion of the supply device (1), opposite the outlet of the main reservoir (2). At the base of the inclined bottom is made a slot, whose function is to provide total discharge of the supply device (1). The slot extends over the entire width of the supply device (1). By sending air through the slot, the last seeds are blown outside the supply device (1) toward the tilted duct (5). The slot is connected to the compressed air source (4) or to another air source. It is possible to supply the slot row by row from the bottom or globally from the side.

In an alternative, the mean (11), configured to adjust the passage section of air passing through a channel (7, 9), is a removable system. The removable system is made up of different movable portions (12), one of which must be slid in the slideway with regard to the desired adjustment. The movable system also uses a sliding system. Each of the movable portions (12) has a different opening that makes it possible to create different air passage sections. Such a removable section makes it possible to perform predefined adjustments with regard to the type of seeds to be distributed. The movable portion (12) implemented at the channel (7, 9) is locked using a locking system (13).

Figure 2:
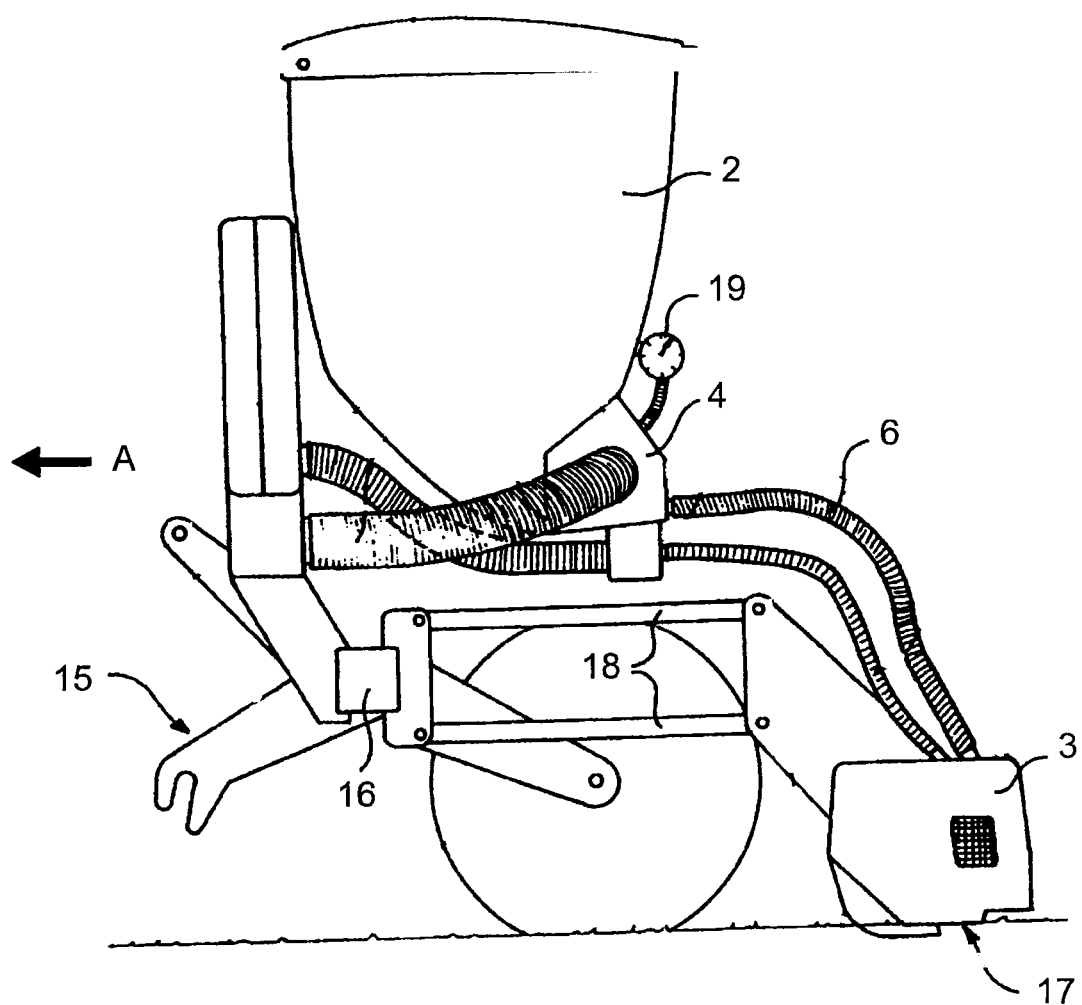
FIG. 2 shows a side view of a distribution machine provided with a supply device according to the invention.

FIG. 2 is a side view of an agricultural machine (15) provided with a remote supply device (1) according to the invention. The agricultural machine (15) illustrated is a seeder. It is a single seeder with pneumatic or mechanical distribution. Such a seeder distributes the seeds one by one over the seed row with a constant spacing. The agricultural machine (15) comprises a chassis (16) on which seeder elements (17) are distributed evenly. The chassis (16) carries the main reservoir (2). Each seeder element (17) has an auxiliary reservoir (3) and a planting element. The number of seeder elements (17) or auxiliary reservoirs (3) corresponds to the number of seed rows. Each seeder element (17) is mounted on the chassis (16) by means of a deformable parallelogram (18) that allows it to move parallel to the ground. The planting member is produced by a share making it possible to put the seeds in the ground. The supply device (1) allows a remote supply of the auxiliary reservoirs (3) from the main reservoir (2). The supply is carried out individually via a respective pipe and with regard to the filling rate of the auxiliary reservoir (3). The accumulation of product in the auxiliary reservoir (3) causes a loss of charge that slows down the air flow in the tilted duct (5) enough to prevent conveying the seeds. The supply of the auxiliary reservoir (3) is therefore interrupted when it is full. When the auxiliary reservoir (3) has emptied, the loss of charge decreases and seed conveyance resumes. The supply device (1) therefore allows a self-regulated supply with regard to the filling rate of the auxiliary reservoir (3). The compressed air source (4) of the pneumatic supply device (1) is provided with a manometer (19).

The main reservoir (2) has a hook (21) attached to its inner wall and near the outlet. The office of this hook (21) is to improve the fluidifying of the seeds when they are suctioned by the first channel (7). The starting of the supply device (1) is made easier owing to the hook (21).

The supply device (1) is made of symmetrical elements each forming two halves of first adjacent channels (7) and two halves of second adjacent channels (9) and making it possible to obtain, by assembly, a block of tight ducts, the number of tight ducts is at least equal to the number of auxiliary reservoirs (3). The symmetrical elements are obtained by moulding. When these symmetrical elements are made from a transparent material, it is possible to monitor the general operation and operation of the different rows of seeds. It is then easy to identify the blocked row(s). Advantageously, at least one additional tight duct is provided making it possible to discharge the main reservoir (2).

Figure 3:
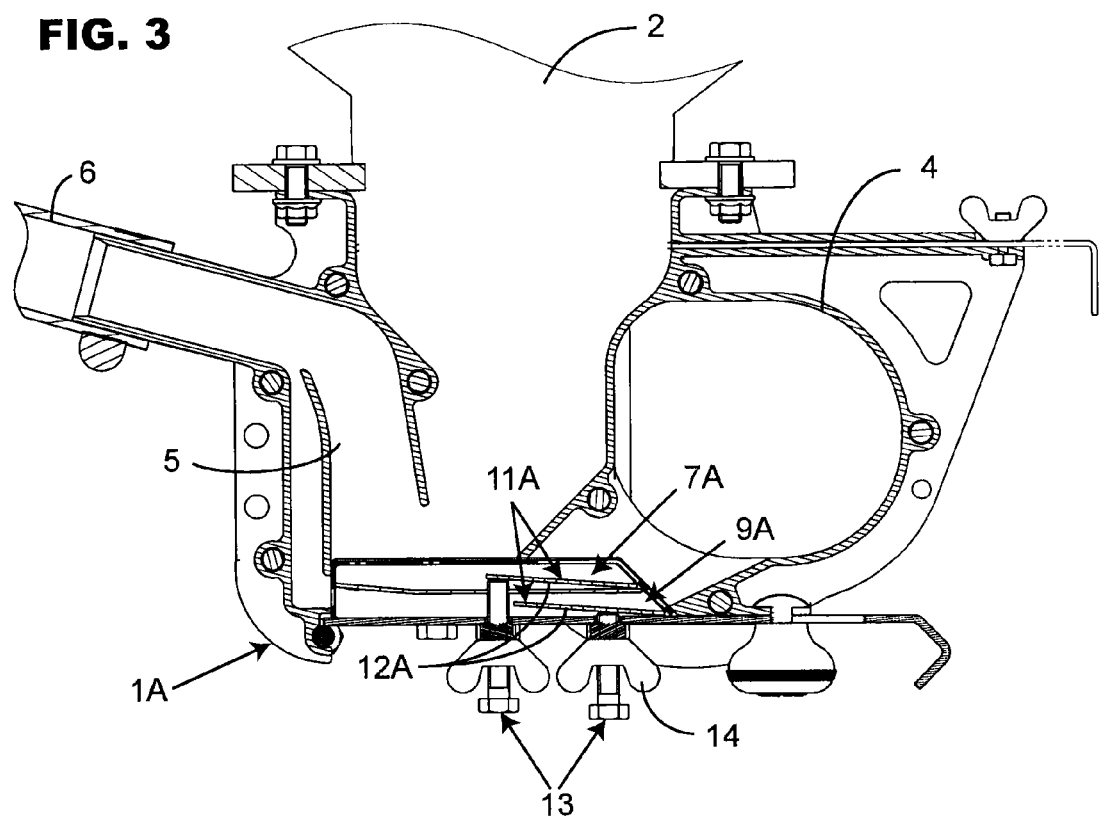
FIG. 3 shows a simplified sectional view of another supply device according to the invention.

FIG. 3 shows a simplified sectional view of a device (1A) for a self-regulated pneumatic supply according to another embodiment. This supply device (1A) differs from that of FIG. 1 by the arrangement of the channels (7A, 9A) relative to the outlet of the main reservoir (2). The channels (7A, 9A) extend substantially below the main reservoir (2). Each air flow is oriented toward a separate channel; the two air flows are separated. The upper channel receives the air flow emitted by the first channel (7A) to pick up seeds and the lower channel receives the air flow emitted by the second channel (9A) for conveying seeds. The first channel (7A) emerges near the outlet of the main reservoir (2), and the second channel (9A) emerges near the inlet of the pipe connections (6). The mean (11A) preset for adjusting the passage section of air passing through the channel (7A, 9A) is a pivoting system. The pivoting system has a movable portion (12A) intended to move in rotation. One of the ends of the movable portion (12A) is rigidly fastened to the bottom of the supply device (1), while the other end is free. The adjustment consists in lifting the free end of the movable portion (12A) to more or less obstruct the inlet at the channel (7A, 9A), and therefore to modify the air flow emitted by the channel (7A, 9A). The adjustment takes place through a threaded rod on which a wing-nut (14) is mounted, the latter making the manipulation easier. FIG. 3 illustrates means (11) adjusted for an air flow for small seeds; the inlet of the channels (7, 9) is partially obstructed. The possibilities previously described for large seeds and for neutralizing a row are possible.

It is obvious that the invention is not limited to the embodiments described above and shown in the appended drawings. Modifications remain possible, in particular regarding the composition or number of the various elements or by substituting technical equivalents, without, however, going beyond the scope of protection as defined by the following claims.

The invention claimed is:

1. A device for a self-regulated pneumatic supply from a main reservoir containing product toward at least one auxiliary reservoir according to filling rate of the at least one auxiliary reservoir, the supply device comprising:
   a compressed air supply;
   a tilted duct connected to pipe connections;
   a bypass air duct including a first channel emerging at an end of the tilted duct connected to an outlet of the main reservoir and a second channel emerging in the titled duct downstream of the first channel to direct air toward an inlet of the pipe connections to bring product to the at least one auxiliary reservoir;
   a sliding system to adjust a passage section of air passing through one of the channels, the sliding system including moveable portion having a first end positioned within the one of the channels and a second end extending to an exterior of the supply device.

2. The supply device according to claim 1, wherein the first end of the moveable portion is positioned within an inlet of the one of the channels.

3. The supply device according to claim 1, wherein the first end of the moveable portion is positioned within an outlet of the one of the channels.

4. The supply device according to claim 1, including symmetrical elements each forming two halves of first adjacent channels and two halves of second adjacent channels a block of ducts is formed by the symmetrical elements in an assembled position, a number of ducts being at least equal to a number of auxiliary reservoirs.

5. The supply device according to claim 4, wherein at least one additional duct is provided.

6. The supply device according to claim 1, wherein each channel comprises a respective mean preset for adjusting the passage section for air passing through the channel.

7. The supply device according to claim 1, wherein the first and second channels are both supplied by the compressed air supply.

8. The supply device according to claim 1, wherein the tilted duct comprises a rising portion.

9. A seeder comprising a supply device according to claim 1.

10. The supply device according to claim 1, wherein the first end of the moveable portion is positioned within the first channel, the sliding system includes a second moveable portion having a first end positioned within the second channel and a second end extending to the exterior of the supply device.

11. The supply device according to claim 1, wherein the sliding system includes a locking system to lock a position of the moveable portion.

12. The supply device according to claim 11, wherein the locking system includes a wing-nut to contact the moveable portion outside of the one of the channels.

* * * * *